US008996292B2

(12) United States Patent
Park et al.

(10) Patent No.: US 8,996,292 B2
(45) Date of Patent: Mar. 31, 2015

(54) APPARATUS AND METHOD GENERATING A GRID MAP

(75) Inventors: Jun-Ho Park, Hwaseong-si (KR); Woo-Yeon Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 830 days.

(21) Appl. No.: 12/926,008

(22) Filed: Oct. 20, 2010

(65) Prior Publication Data

US 2011/0178709 A1 Jul. 21, 2011

(30) Foreign Application Priority Data

Jan. 20, 2010 (KR) ........................ 10-2010-0005349

(51) Int. Cl.
*G06F 17/00* (2006.01)
*B25J 5/00* (2006.01)
*B25J 9/08* (2006.01)
*G09B 29/00* (2006.01)

(52) U.S. Cl.
CPC ............... *G09B 29/00* (2013.01); *Y10S 901/01* (2013.01)
USPC .................. 701/300; 701/25; 701/301; 901/1

(58) Field of Classification Search
CPC ........................................................ G09B 1/00
USPC ................................ 701/300, 25, 301; 901/1
See application file for complete search history.

(56) References Cited

U.S. PATENT DOCUMENTS

| 4,820,041 | A | 4/1989 | Davidson et al. |
| 7,630,792 | B2 | 12/2009 | Kim |
| 2006/0149465 | A1 | 7/2006 | Park et al. |
| 2007/0271011 | A1 | 11/2007 | Lee et al. |
| 2008/0154429 | A1* | 6/2008 | Lee et al. ...................... 700/258 |
| 2009/0093960 | A1* | 4/2009 | Puhalla et al. ................. 701/301 |
| 2009/0125175 | A1* | 5/2009 | Park et al. ....................... 701/28 |

FOREIGN PATENT DOCUMENTS

| JP | 63-200207 | 8/1988 |
| KR | 1995-0005402 | 5/1995 |
| KR | 10-0565227 | 3/2006 |
| KR | 10-0745975 | 7/2007 |
| KR | 10-2007-0109748 | 11/2007 |

* cited by examiner

*Primary Examiner* — Fadey Jabr
*Assistant Examiner* — Yazan A Soofi
(74) *Attorney, Agent, or Firm* — Harness, Dickey & Pierce, P.L.C.

(57) ABSTRACT

An apparatus and method generating a grid map are provided. The grid map generating apparatus generates a grid map while turning 360 degrees at a dynamically adjustable rotational velocity. The dynamically adjustable rotational velocity allows grid points to have equal intervals on the grid map. The grid map generating apparatus generates a grid map while making a complete turn, and generates a grid map corresponding to a non-linear section while making another turn.

23 Claims, 8 Drawing Sheets

APPARATUS AND METHOD GENERATING A GRID MAP

CROSS-REFERENCE TO RELATED APPLICATIONS

This application claims the benefit under 35 U.S.C. §119(a) of Korean Patent Application No. 10-2010-0005349, filed on Jan. 20, 2010, the disclosure of which is incorporated by reference in its entirety for all purposes.

BACKGROUND

1. Field

One or more embodiments relate to a robot and a technology generating a map for position recognition of a robot.

2. Description of the Related Art

The term "robot" has been generally applied to an autonomous figure having a human form which is equipped with a machine to operate body parts including mechanical limbs to perform functions in a humanlike manner. However, nowadays, the term of 'robot' can refer to a machine that may not resemble human beings in appearance but may be able to autonomously perform tasks.

In particular, a mobile robot is desirable in performing tasks in harsh environments or dangerous areas, replacing humans. In addition, a domestic mobile robot, such as a cleaning robot, which autonomously moves around a home are becoming increasingly common for helping housework.

In order for a mobile robot to perform its tasks by freely moving, the recognition of the surrounding environment of the robot is desirable. The recognition of the surrounding environment may be achieved through a map. A grid map is one representative example of such a map that is formed by representing the surrounding environment using equally sized grid squares and expressing an object on the grid squares. The robot generates a grid map for surrounding environment using a distance measuring sensor.

As a representative example of a method of generating a grid map of the surrounding environment of a robot, the robot may obtain distance information while turning 360 degrees while at the same position and generate a grid map using the obtained distance information. However, if the robot turns 360 degrees at the same rotational velocity, the generated grid map may be inaccurate due to the difference between the rotational velocity of the robot and distance information update velocity of distance information of the distance measuring sensor.

SUMMARY

In one general aspect, there is provided an apparatus generating a grid map. The apparatus may include a distance measuring unit configured to measure a distance to an object, and a rotational velocity determination unit configured to determine a rotational velocity of a grid map generating apparatus based on the measured distance to the object.

The rotational velocity may be defined using an angular velocity and in inverse proportion to the measured distance to the object.

In another general aspect, there is provided an apparatus generating a grid map. The apparatus includes a distance measuring unit configured to measure a distance to an object, a first rotational velocity determination unit and a second rotational velocity determination unit. If a turn of a grid map generating apparatus is incomplete, the first rotational velocity determination unit determines a first rotational velocity of the grid map generating apparatus based on the measured distance to the object. If a turn of the grid map generating apparatus is complete, the second rotational velocity determination unit determines a second rotational velocity of the grid map generating apparatus based on a presence of a non-linear section that is defined as an area of generated grid map having a grid interval exceeding a threshold value.

The first rotational velocity may be defined using an angular velocity and in inverse proportion to the measured distance to the object. The second rotational velocity may be a velocity lower than the first rotational velocity.

In another general aspect, there is provided a method generating a grid map by rotating a grid map generating apparatus. The method may include measuring a distance to an object and determining a rotational velocity of the grid map generating apparatus based on the measured distance to the object.

In another general aspect, there is provided a method measuring a distance to an object by rotating a grid map generating apparatus. The method is as follows. If a turn of the grid map generating apparatus is incomplete, a first rotational velocity of the grid map generating apparatus is determined based on the measured distance to the object. If a turn of the grid map generating apparatus is complete, a second rotational velocity of the grid map generating apparatus is determined based on a presence of a non-linear section that is defined as an area of a generated grid map having a grid interval exceeding a threshold value.

In another general aspect, there is provided a method generating a grid map of a robot. The method is as follows. A distance to a first point of an object is measured. A portion of the grid map is generated by rotating the robot at a first rotational velocity determined based on the distance to the first point and measuring a distance to a second point of the object. It is determined whether a turn of the robot is complete. If a turn of the robot is incomplete, a remaining portion of the grid map is generated by continually and sequentially performing the measuring of distance and the generating of the remaining portion of the grid map. If a turn of the robot is complete, a presence of a non-linear section is determined. The non-linear section is defined as an area of a generated grid map having a grid interval exceeding a threshold value. If the non-linear section is present, the area of the grid map corresponding to the non-linear section is regenerated based on a second rotational velocity lower than the first rotational velocity.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1A:
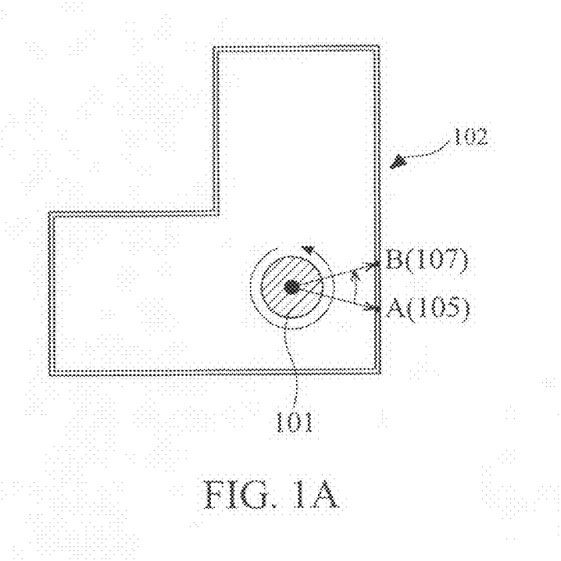
FIG. 1A shows a robot for generating a grid map, according to one or more embodiments.

FIG. 1A shows a robot for generating a grid map, according to one or more embodiments.

As shown in FIG. 1A, a robot 101 is implemented as a mobile robot, for example, a cleaning robot, that generates a map of a surrounding environment and may perform a predetermined task based on the generated map. The robot 101 is provided with a distance measuring sensor. The robot 101 or the distance measuring sensor provided in the robot 101 measures a distance to an object 102, which may include one or more walls, as only an example, while turning 360 degrees and builds a map or moves away from an obstacle using the measured distance.

Figure 1B:
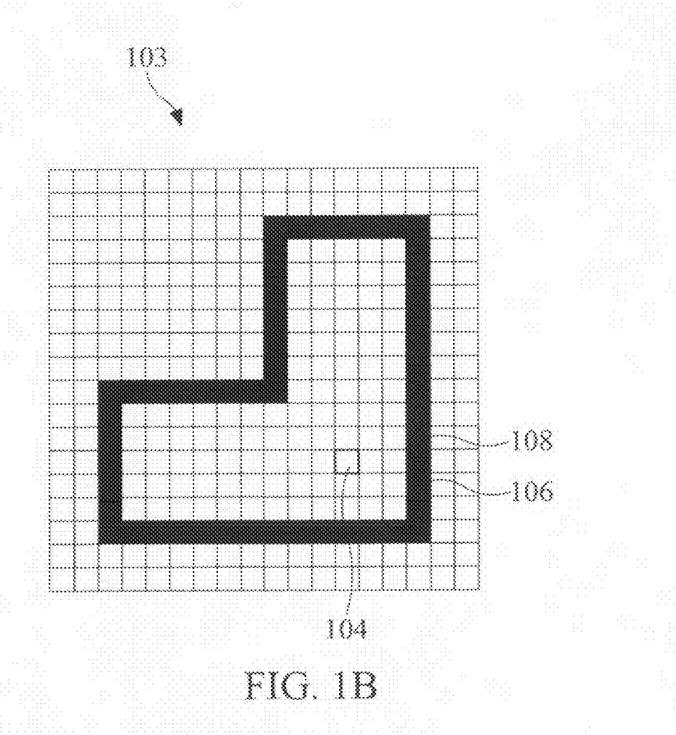
FIG. 1B shows a grid map, according to one or more embodiments.

FIG. 1B shows a grid map which is produced by a grid map generating process, according to one or more embodiments.

As shown in FIG. 1B, a grid map 103 is one representative form of such a map that is formed by dividing a predetermined space into equally sized grid squares and representing objects on the grid squares. For example, a white grid square of the grid map 103 represents a region having no object and a black grid square of the grid map 103 represents a region having an object. Accordingly, a line connecting black grid squares may represent a boundary between spaces, for example, a wall, an obstacle, etc. In this example, the generating of the grid map 103 is to represent a predetermined point of an object as a black grid square based on distance information.

Referring to FIGS. 1A and 1B, it is supposed that the position of the robot 101 corresponds to a grid point 104.

The robot 101 emits light to a point 105 ("A") of the object 102 for measuring a distance to the point 105. After that, the robot 101 measures a distance to the point 105 by detecting the light reflected from the point 105. After the measuring of the distance to the point 105, the robot 101 generates a grid point 106 corresponding to the point 105 on the grid map 103 by use of the robot's own grid point 104 and the direction/distance to the point 105.

Then, the robot 101 rotates at a predetermined rotational velocity. The robot 101 measures a distance to a point 107 ("B") and generates a grid point 108 corresponding to the point 107.

In this manner, the robot 101 may generate the grid map 103 for the object 102 while rotating. In this example, the subject of rotational motion is the robot 101, but is not limited thereto. For example, the robot 101 may rotate or the distance measuring sensor provided in the robot 101 may rotate.

Figure 2A:
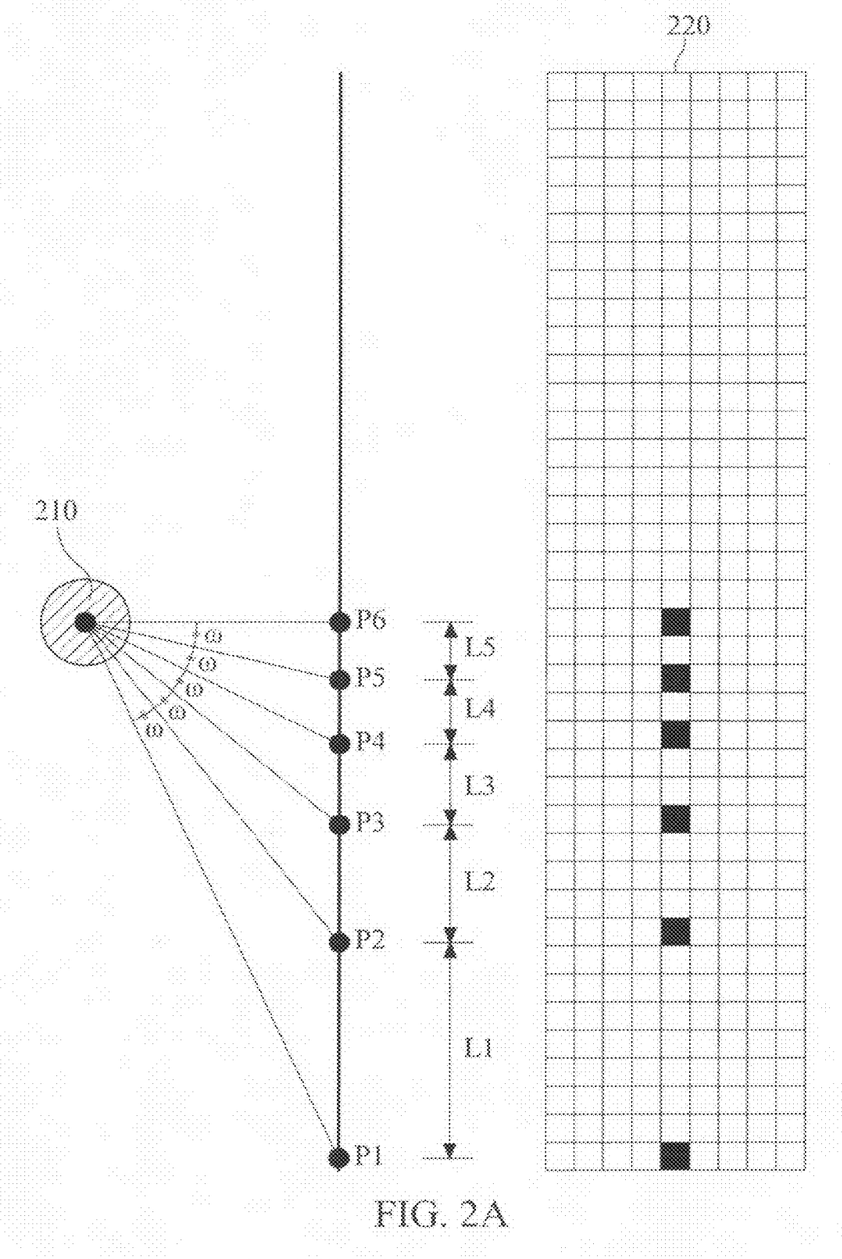
FIG. 2A shows a grid map generating apparatus operating at a constant rotational velocity, according to one or more embodiments.

FIG. 2A shows a grid map generating apparatus operating at a constant rotational velocity, according to one or more embodiments.

As shown in FIG. 2A, a grid map generating apparatus 210 rotates at a constant rotational velocity, for example, a constant angular velocity ω. While rotating at a constant rotational velocity, the grid map generating apparatus 210 measures individual distances with respect to points P1 to P6 and generates a grid map 220. However, since the grid map generating apparatus 210 rotates at a constant rotational velocity, intervals among the points P1 to P6, that is, the lengths L1, L2, L3, L4 and L5 may not be equal. Accordingly, intervals among grid points on the grid map 220 may not be equal.

Figure 2B:
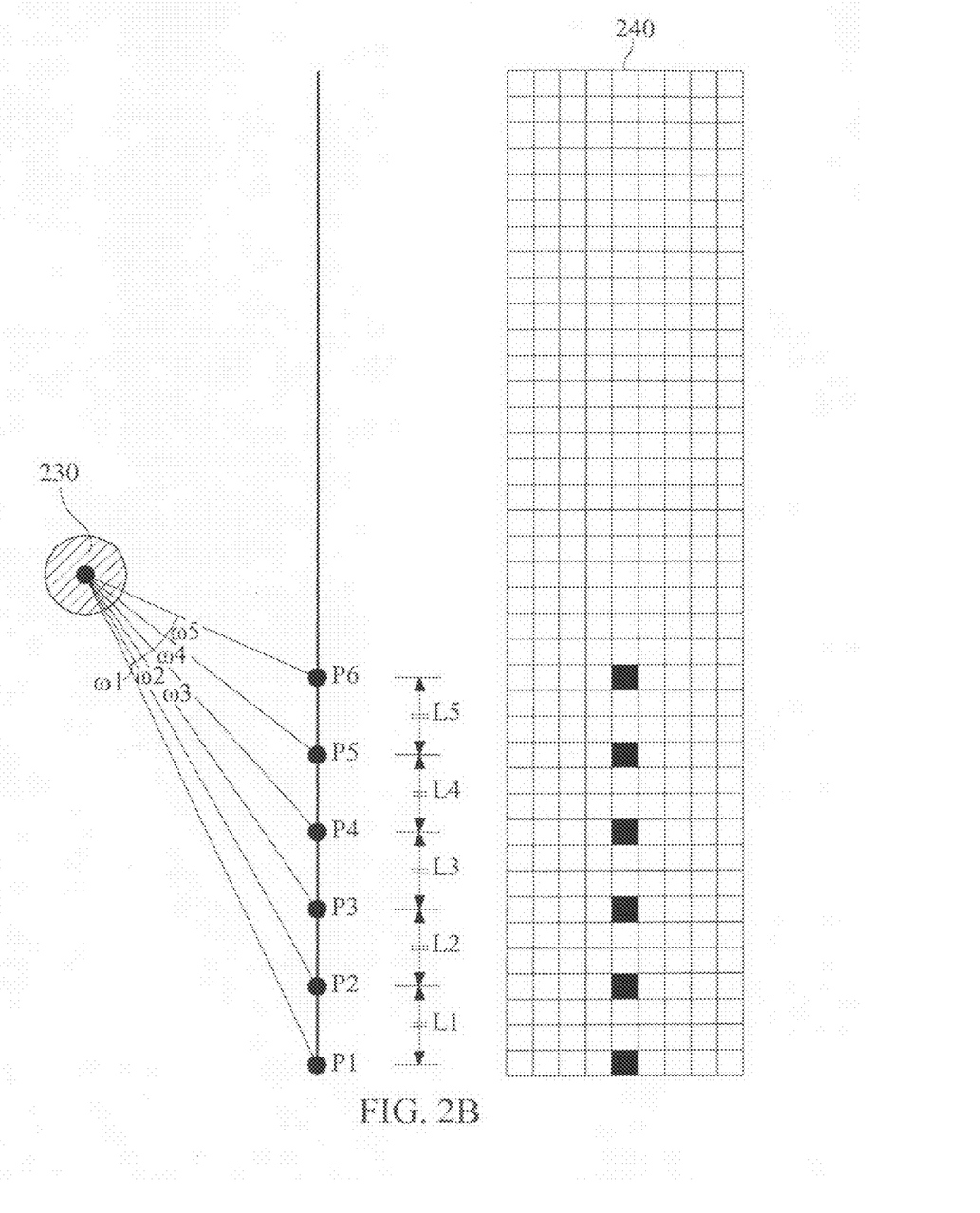
FIG. 2B shows a grid map generating apparatus that operates at a dynamically adjustable rotational velocity, according to one or more embodiments.

FIG. 2B shows a grid map generating apparatus that operates at a dynamically adjustable rotational velocity, according to one or more embodiments.

As shown in FIG. 2B, the grid map generating apparatus 220 rotates at a rotational velocity that can be dynamically adjustable, for example, among the angular velocities of $\omega_1$, $\omega_2$ $\omega_3$ $\omega_4$ and $\omega_5$. The grid map generating apparatus 220 represents the grid points of the grid map 240 at equal intervals by adjusting the rotational velocity.

The rotational velocity may be calculated by the below Equation 1, for example.

$$\omega_1 = \frac{d_1}{t \times r_1} \qquad \text{Equation 1}$$

In Equation 1, $\omega_1$ represents the angular velocity maintained during the rotation from the point P1 to the point P2, t is a period by which a distance is measured, that is, a sampling rate, and $d_1$ is a distance to the point P1. Since t and $d_1$ may be preset values, Equation 1 may be generalized according to the below Equation 2, for example.

$$\omega_n = \frac{k}{r_n} \qquad \text{Equation 2}$$

As described above, when generating the grid map 240 while rotating, the grid map generating apparatus 230 enables the grid points of the grid map 240 to have equal intervals.

Figure 3:
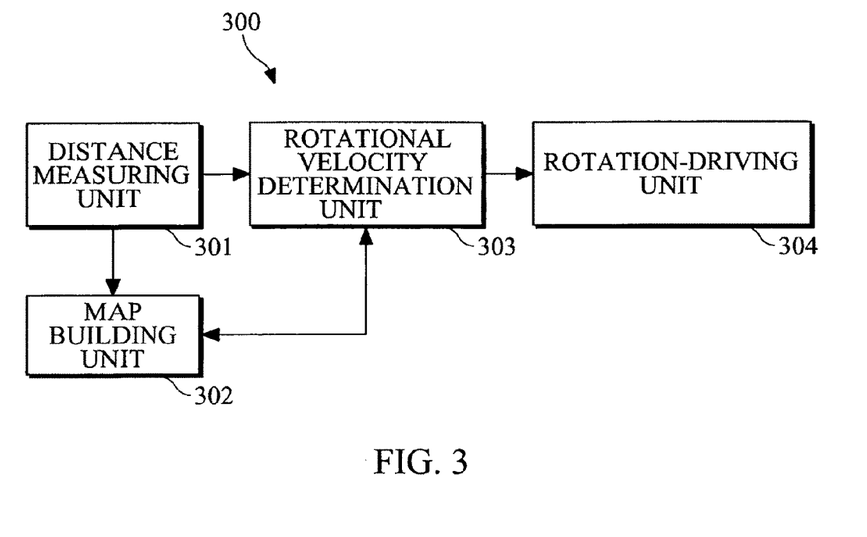
FIG. 3 shows a configuration of a grid map generating apparatus, according to one or more embodiments.

FIG. 3 shows a configuration of a grid map generating apparatus, according to one or more embodiments.

As shown in FIG. 3, the grid map generating apparatus 300 may include a distance measuring unit 301, a map building unit 302, a rotational velocity determination unit 303, and a rotation-driving unit 304, for example.

As shown in FIG. 3, the grid map generating apparatus 300 may be mounted on a mobile robot that performs a predetermined task while moving in a working area. In addition, the grid map generating apparatus 300 may include a mobile unit.

In order to generate a grid map of an object, the grid map generating apparatus 300 scans the surround environment. In this case, the method of scanning the surrounding environment may be implemented in various forms. For example, the surrounding environment may be scanned by rotating the grid map generating apparatus 300 rotating a mobile robot provided with the grid map generating apparatus 300 or rotating a scanning device such as a distance measuring sensor.

The distance measuring unit 301 may be a scanning device for measuring a distance to an object. The distance measuring unit 301 may emit light and detects the light reflected from the object. In addition, the distance measuring unit 301 may measure the distance to the object through the light that is detected based on the time difference and trigonometry. To this end, the distance measuring unit 301 may include a light emitting device such as a light emission diode (LED) and a photodetector, for example, a photo diode and a position sensitive detector (PSD), which detects light reflected from an object and measures the distance to the object. In addition, the distance measuring unit may further include an ultrasonic sensor or a laser sensor, as only examples.

The map building unit 302 builds the grid map 103 shown in FIG. 1B by use of the measured distance to the object.

The rotational velocity determination unit 303 determines the rotational velocity of the grid map generating apparatus 300. As described above, the rotational motion may be made by the grid map generating apparatus 300, the robot provided with the grid map generating apparatus 300 or the distance measuring unit 301. Here, the rotational velocity is not limited to the rotational velocity of the grid map generating apparatus 300 and may represent a velocity with which the surrounding environment is scanned for grid map generation.

As expressed in Equation 1 and Equation 2, if a first point of the object corresponds to a first rotational position of the grid map generating apparatus 300 and a second point of the object corresponds to a second rotational position of the grid map generating apparatus 300, in the determining of rotational velocity, the rotational velocity for a rotation motion from the first rotation position to the second rotational position may be determined to be in inverse proportion to the distance to the first point.

The rotation-driving unit 304 controls the rotational operation of the grid map generating apparatus 300, the robot provided with the grid map generating apparatus 300 or the distance measuring unit 301 at the determined rotational velocity.

Figure 4A:
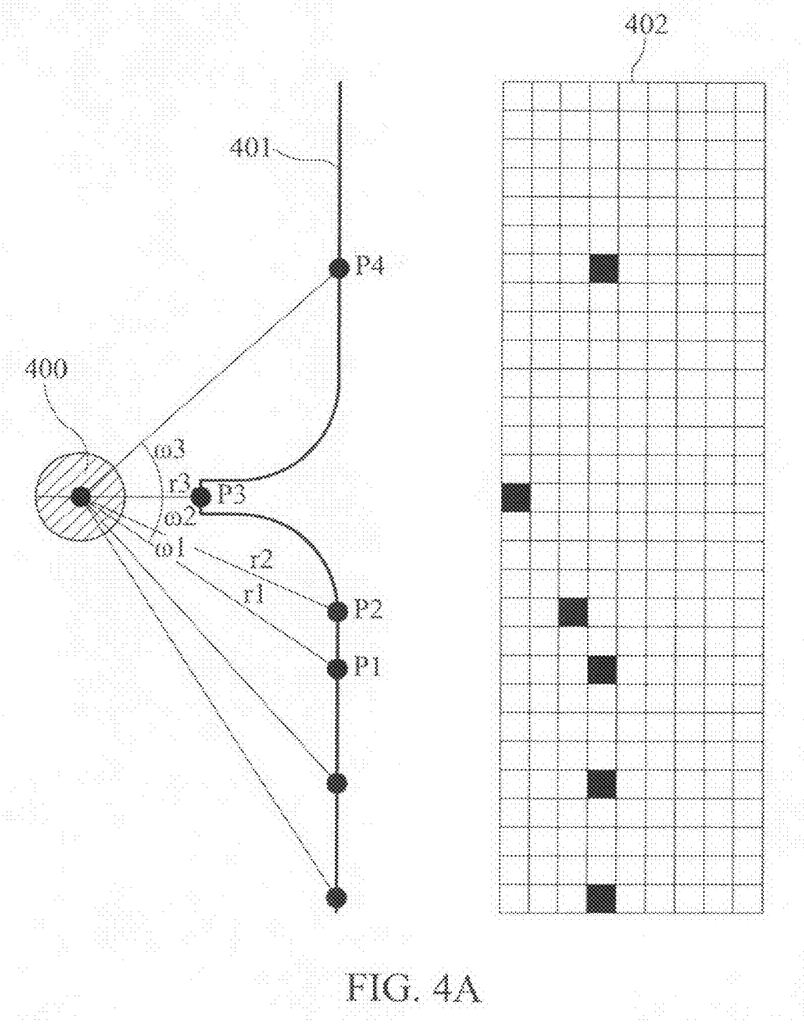
FIGS. 4A and 4B show a grid map generating apparatus operating at a dynamically adjustable rotational velocity, according to one or more embodiments.
Figure 4B:
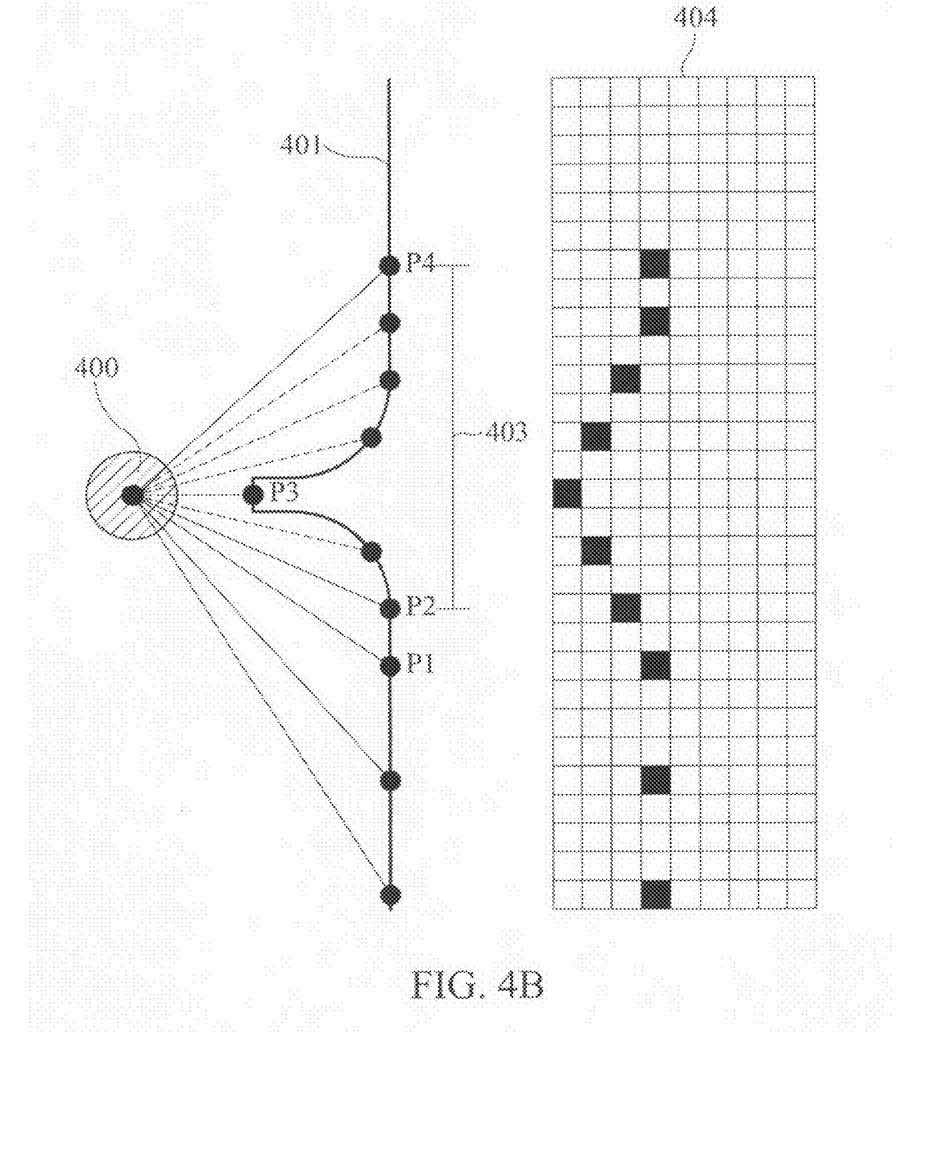

FIGS. 4A and 4B show a grid map generating apparatus that operate at a dynamically adjustable rotational velocity, according to one or more embodiments.

As shown in FIG. 4A, if a non-linear area is present in an object 401, grid points may not have equal intervals. For example, as expressed in Equation 1, the angular velocity $\omega_3$ is determined based on $r_3$. Since $r_3$ is smaller than $r_2$, $\omega_3$ may be larger than $\omega_2$. Accordingly, the interval between grid points corresponding to points P3 and P4 may result in non-uniform intervals over the entire grid points. In addition, if the distance between P2 and P3 is large, the interval between grid points corresponding to points P2 and P3 may also result in non-uniform intervals over the entire grid points.

As shown in FIG. 4B, the grid map generating apparatus 400 rebuilds a grid map 404 for the non-linear area 403 of the object 401. For example, after the grid map generating apparatus 400 makes a complete turn, the grid map generating apparatus 400 determines whether the grid map 402 has an area having a grid interval exceeding a threshold value. The non-linear area represents an area of the object which produces a grid interval exceeding a threshold value in the grid map. If the non-linear area exists in the object 401, the grid map generating apparatus 400 scans the non-linear area again and builds the grid map 404. While secondarily scanning the non-linear area, the grid map generating apparatus 400 may scan at a rotational velocity lower than the previous rotational velocity.

In this manner, the grid map generating apparatus 400 generates a grid map while making a complete turn at a rotational velocity allowing grid points to have a uniform interval. If a non-linear area exists, the grid map generating apparatus 400 generates a detailed grid map corresponding to the non-linear area while making another turn.

Figure 5:
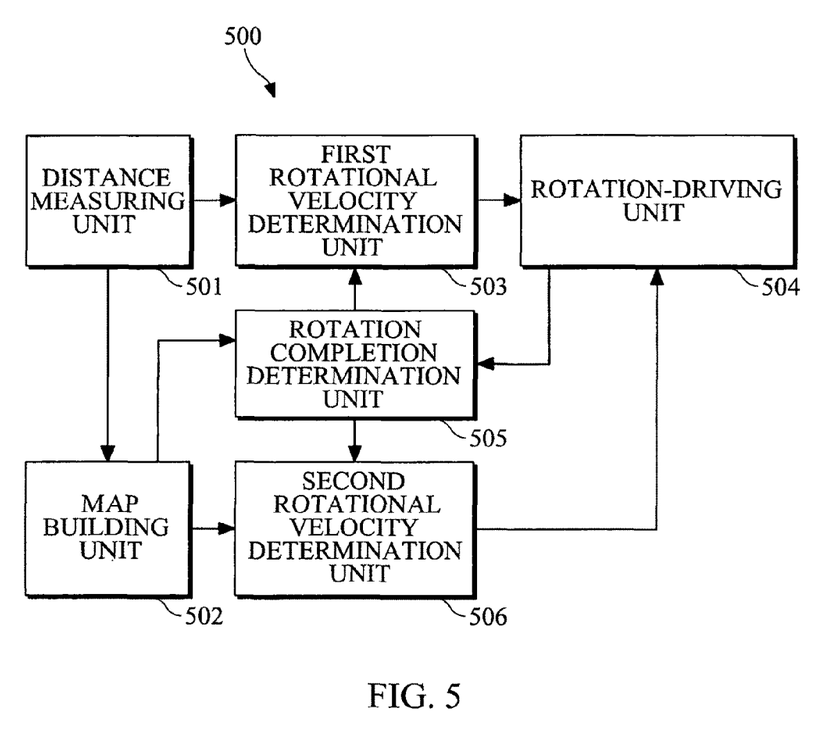
FIG. 5 shows a configuration of a grid map generating apparatus, according to one or more embodiments.

FIG. 5 shows a configuration of a grid map generating apparatus, according to one or more embodiments.

As shown in FIG. 5, a grid map generating apparatus 500 may include a distance measuring unit 501, a map building unit 502, a first rotational velocity determination unit 503, a rotation-driving unit 504, a rotation completion determination unit 505, and a second rotational velocity determination unit 506, for example.

In FIG. 5, the grid map generating apparatus 500 may be mounted on a mobile robot that performs a predetermined task while moving in a working area. In addition, the grid map generating apparatus 300 may include the mobile robot. Since the distance measuring unit 501, the map building unit 502 and the first rotational velocity determination unit 503 are similar to those shown in FIG. 3, the descriptions thereof will be omitted in order to avoid redundancy.

The rotation-driving unit 504 selectively controls the rotational operation of the grid map generating apparatus 500 at a velocity determined by the first rotational velocity determination unit 503 or the second rotational velocity determination unit 506, a robot provided with the grid map generating apparatus 500 or the distance measuring unit 501.

The rotation completion determination unit 505 determines whether the grid map generating apparatus 500, the robot provided with the grid map generating apparatus 505, or the distance measuring unit 501 makes a complete turn. If the turn is incomplete, the rotation-driving unit 504 controls the rotational operation by use of a first rotational velocity of the first rotational velocity determination unit 503. If the turn is complete, the rotation-driving unit 504 controls the rotational operation by use of a second rotational velocity of the second rotational velocity determination unit 506.

Based on the control of the rotation completion determination unit 505, the second rotational velocity determination unit 506 determines whether a non-linear section exists in a grid map generated during the first complete turn. The non-linear section may be defined as an area of a generated grid map having a grid interval exceeding a threshold value. If a non-linear section exists, the second rotational velocity determination unit 506 determines a second rotational velocity corresponding to the non-linear section. For example, the second rotational velocity may have a value smaller than the angular velocities $\omega_1$ to $\omega_3$ shown in FIG. 4A.

Figure 6:
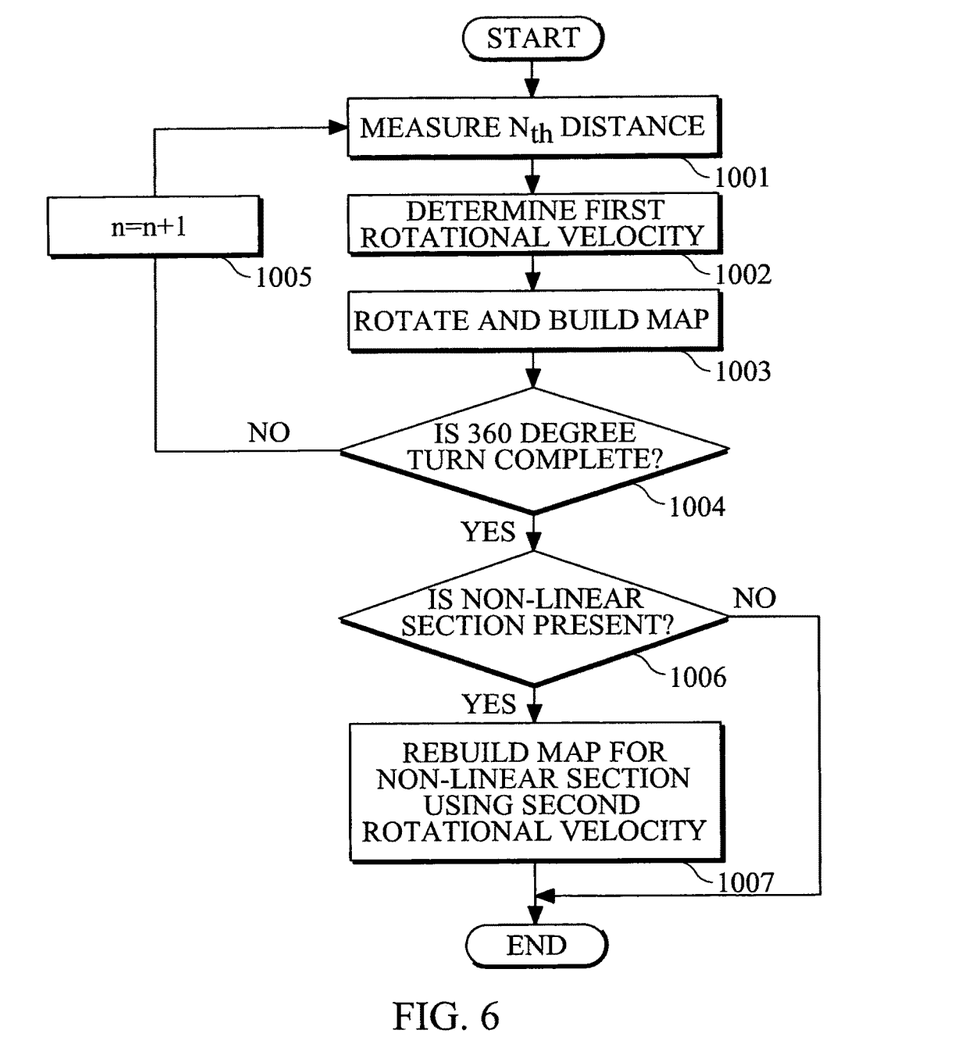
FIG. 6 shows a method generating a grid map, according to one or more embodiments.

FIG. 6 shows a method generating a grid map, according to one or more embodiments, such as in which a grid map is generated using a robot provided with the grid map generating apparatus 500 shown in FIG. 5.

As shown in FIG. 6, first, a distance to a predetermined point of an object is measured (1001). For example, the distance measuring unit 501 may measure the distance to the object by scanning a surrounding environment using light or laser.

After that, a first rotational velocity of the robot is determined (1002). For example, the first rotational velocity determination unit 503 may calculate a rotational velocity from a first rotational position to a second rotational position of the robot based on a distance to a first point of the object. In this case, the rotational velocity from the second rotational position to a next rotational position may be in inverse proportion to a distance to the object that is measured at a previous rotational position, that is, the second rotational position.

As the robot provided with the grid map generating apparatus 500 builds a portion of a grid map while rotating at the first rotational velocity (1003) and determines whether a 360 degree turn is complete (1004).

If a 360 degree turn is incomplete, a distance to a next point of the object is measured by increasing the value "n" (1005), and the above processes are repeated.

If a 360 degree turn is complete, it is determined whether a non-linear section exists on the map generated until the robot makes a complete turn (1006). For example, the second rotational velocity determination unit 506 may determine the presence of an area of the grid map having a grid interval exceeding a threshold value.

If a non-linear section exists, a grid map corresponding to the non-linear section is rebuilt using a second rotational velocity lower than the first rotational velocity. For example, the second rotational velocity determination unit 506 determines a second rotational velocity and the rotation-driving unit 504 performs control operations such that the robot rotates to correspond to the non-linear section again at the second rotational velocity.

In one or more embodiments, apparatus, system, and unit descriptions herein include one or more hardware processing elements. For example, each described unit may include one or more processing elements performing the described operation, desirable memory, and any desired hardware input/output transmission devices. Further, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), which executes (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus generating a grid map, the apparatus comprising:
    a distance measuring unit configured to measure a distance to a scanned object; and
    a rotational velocity determination unit configured to set a needed rotational velocity of a grid map generating apparatus based on the measured distance to the object according to a velocity at which a surrounding environment is scanned.

2. The apparatus of claim 1,
    wherein the rotational velocity is defined using an angular velocity and is in inverse proportion to the measured distance to the object.

3. The apparatus of claim 1, wherein, if a first point of the object corresponding to a first rotational position of the grid map generating apparatus and a second point of the object corresponding to a second rotational position of the grid map generating apparatus exist, the rotational velocity determination unit calculates a rotational velocity for a rotational motion from the first rotational position to the second rotational position based on a distance to the first point.

4. The apparatus of claim 1, wherein the apparatus is the grid map generating apparatus and is provided as a mobile robot or provided in the mobile robot.

5. An apparatus generating a grid map, the apparatus comprising:
    a distance measuring unit configured to measure a distance to an object;
    a first rotational velocity determination unit configured, if a turn of a grid map generating apparatus is incomplete, to determine a first rotational velocity of the grid map generating apparatus based on the measured distance to the object; and
    a second rotational velocity determination unit configured, if a turn of the grid map generating apparatus is complete, to determine a second rotational velocity of the grid map generating apparatus based on a presence of a non-linear section that is defined as an area of a generated grid map having a grid interval exceeding a threshold value.

6. The apparatus of claim 5, wherein the second rotational velocity is determined by the generated grid map being obtained based on the first rotational velocity.

7. The apparatus of claim 5, wherein the first rotational velocity is defined using an angular velocity and is in inverse proportion to the measured distance to the object.

8. The apparatus of claim 5, wherein, if a first point of the object corresponding to a first rotational position of the grid map generating apparatus and a second point of the object corresponding to a second rotational position of the grid map generating apparatus exist, the first rotational velocity determination unit calculates a rotational velocity for a rotational motion from the first rotational position to the second rotational position based on a distance to the first point.

9. The apparatus of claim 5, wherein the apparatus is the grid map generating apparatus and is provided as a mobile robot or provided in the mobile robot.

10. A method generating a grid map by rotating a grid map generating apparatus, the method comprising:
   measuring a distance to a scanned object using a distance measuring device; and
   setting a needed rotational velocity of the grid map generating apparatus based on the measured distance to the object according to a velocity at which a surrounding environment is scanned.

11. The method of claim 10, wherein the rotational velocity is defined using an angular velocity and is in inverse proportion to the measured distance to the object.

12. The method of claim 10, wherein, the determining of the rotational velocity comprises, if a first point of the object corresponding to a first rotational position of the grid map generating apparatus and a second point of the object corresponding to a second rotational position of the grid map generating apparatus exist, calculating a rotational velocity for a rotational motion from the first rotational position to the second rotational position based on a distance to the first point.

13. A method generating a grid map by rotating a grid map generating apparatus, the method comprising:
   measuring a distance to an object using a distance measuring device;
   if a turn of the grid map generating apparatus is incomplete, determining a first rotational velocity of the grid map generating apparatus based on the measured distance to the object; and
   if a turn of the grid map generating apparatus is complete, determining a second rotational velocity of the grid map generating apparatus based on a presence of a non-linear section that is defined as an area of a generated grid map having a grid interval exceeding a threshold value.

14. The method of claim 13, wherein the second rotational velocity is determined by the generated grid map being obtained based on the first rotational velocity.

15. The method of claim 13, wherein the rotational velocity is defined using an angular velocity and is in inverse proportion to the measured distance to the object.

16. The method of 13, wherein, the determining of the first rotational velocity comprises, if a first point of the object corresponding to a first rotational position of the grid map generating apparatus and a second point of the object corresponding to a second rotational position of the grid map generating apparatus exist, calculating a rotational velocity for a rotational motion from the first rotational position to the second rotational position based on a distance to the first point.

17. A method generating a grid map of a robot, the method comprising:
   measuring a distance to a first point of a scanned object using a distance measuring device; and
   generating a portion of the grid map by rotating the robot at a first needed rotational velocity set based on the distance to the first point and measuring a distance to a second point of the object.

18. The method of claim 17, further comprising:
   determining whether a turn of the robot is complete;
   if a turn of the robot is incomplete, generating a remaining portion of the grid map by continually and sequentially performing the measuring of distance and the generating of the remaining portion of the grid map;
   if a turn of the robot is complete, determining a presence of a non-linear section that is defined as an area of a generated grid map having a grid interval exceeding a threshold value; and
   if the non-linear section is present, regenerating the area of the grid map corresponding to the non-linear section based on a second rotational velocity different from the first rotational velocity.

19. The apparatus of claim 1, wherein the determining of the rotational velocity is based on determining the rotational velocity so as to control an interval between a first position on the object corresponding to the measured distance and a subsequent position on the object corresponding to a subsequently measured distance to the object measured while rotating at the determined rotational velocity.

20. The apparatus of claim 1, wherein the determining of the rotational velocity includes determining the rotational velocity so as to be instituted while a subsequent distance measurement is performed by the distance measuring unit.

21. The method of claim 10, wherein the determining of the rotational velocity is based on determining the rotational velocity so as to control an interval between a first position on the object corresponding to the measured distance and a subsequent position on the object corresponding to a subsequently measured distance to the object measured while rotating at the determined rotational velocity.

22. The method of claim 10, wherein the determining of the rotational velocity is based on determining the rotational velocity so as to be instituted while a subsequent distance measurement is performed using the distance measuring device.

23. The method of claim 10, wherein the distance measuring device includes a distance measuring sensor configured to detect reflected light, an ultrasonic sensor configured to detect reflected ultrasonic waves, and/or a laser sensor configured to detect reflected laser light.

* * * * *